Nov. 18, 1958 J. V. WEBSTER ET AL 2,860,718
COUPLING AND CLUTCHING MEANS FOR POWER AND
TRACTION DEVICES AND IMPLEMENTS
Filed Feb. 29, 1956 5 Sheets-Sheet 1

INVENTORS
JOHN VINCENT WEBSTER
BYRON T. AASLAND
GEORGE R. LOUTHAN
By Nathan N. Kraus
Frank H. Marks
attys.

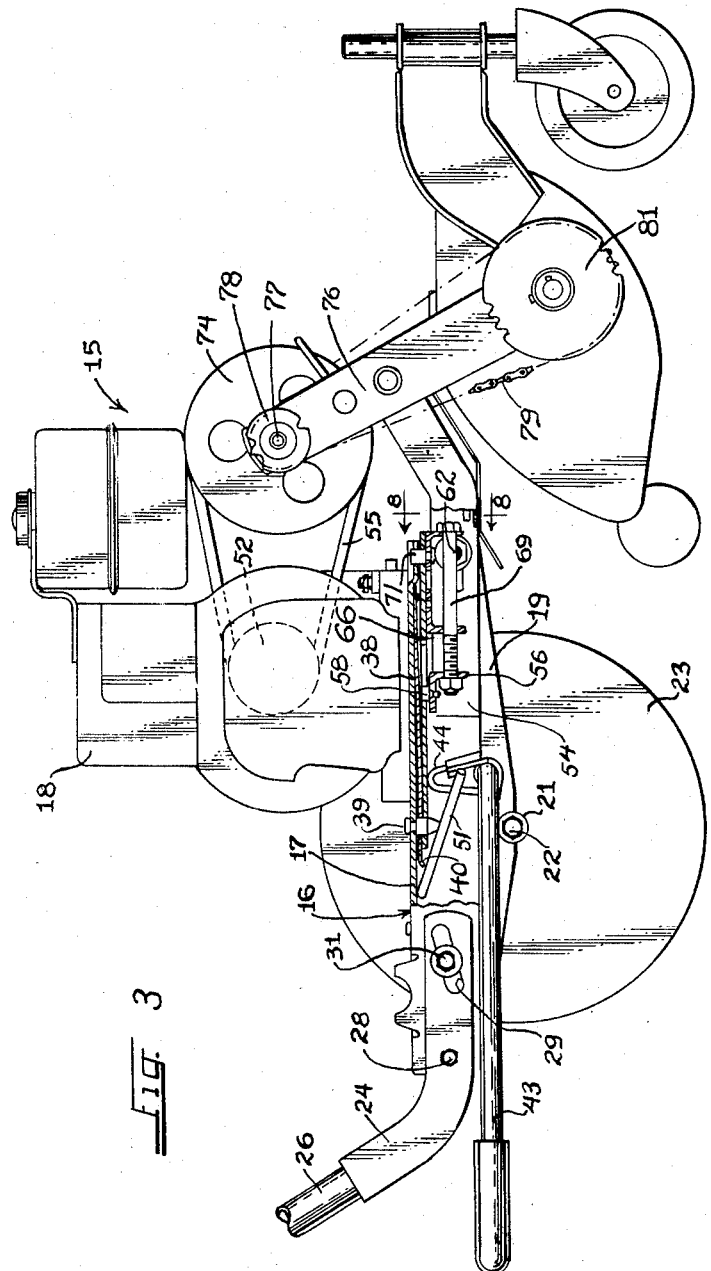

Nov. 18, 1958     J. V. WEBSTER ET AL     2,860,718
COUPLING AND CLUTCHING MEANS FOR POWER AND
TRACTION DEVICES AND IMPLEMENTS
Filed Feb. 29, 1956     5 Sheets-Sheet 3
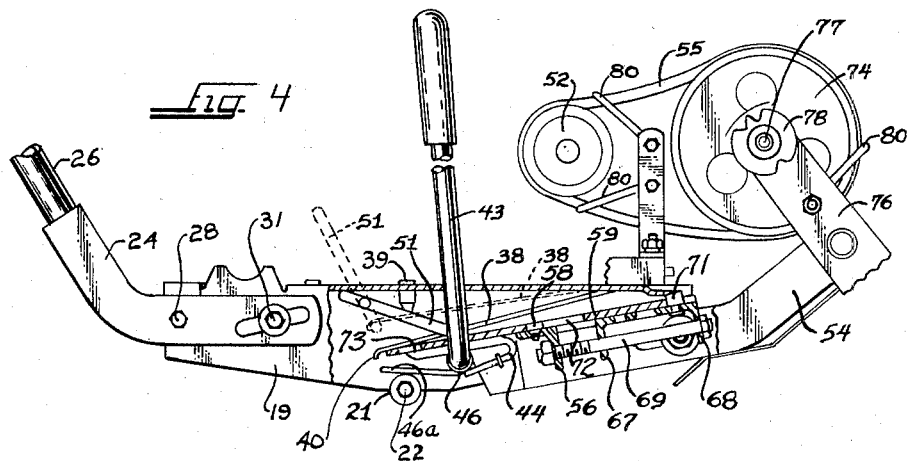
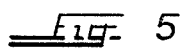
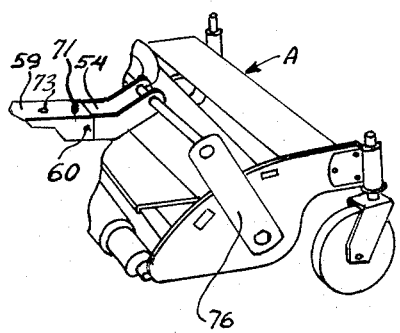
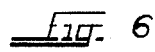
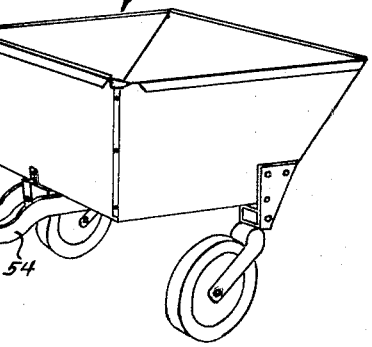
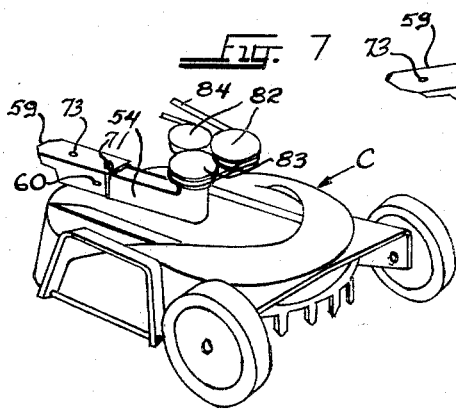
*INVENTORS*
*JOHN VINCENT WEBSTER*
*BYRON T. AASLAND*
*GEORGE R. LOUTHAN*

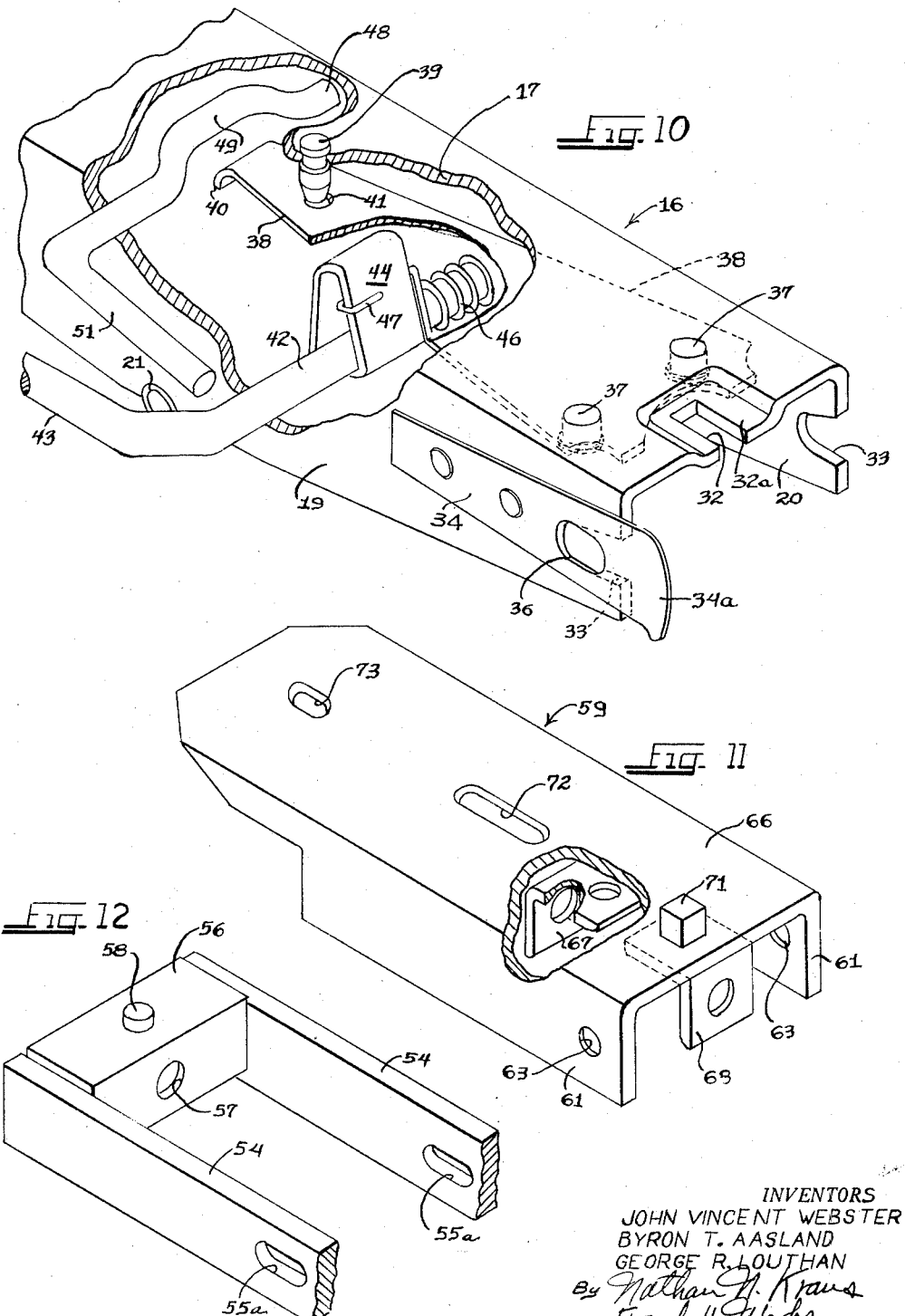

United States Patent Office 2,860,718
Patented Nov. 18, 1958

2,860,718

COUPLING AND CLUTCHING MEANS FOR POWER AND TRACTION DEVICES AND IMPLEMENTS

John Vincent Webster, Byron T. Aasland, and George R. Louthan, Kankakee, Ill., assignors to Sears, Roebuck and Co., Chicago, Ill., a corporation of New York Application February 29, 1956, Serial No. 568,598

4 Claims. (Cl. 180—53)

Our invention relates to power and traction devices generally and more particularly to hitch means associated with such devices for rapidly coupling various types of implements or work units to the same.

One of the objects of our invention is the provision of a power and traction device having means associated therewith for effecting rapid coupling or uncoupling of various types of implements or work units without the use of separate tools or the like.

Another object of our invention is the provision of a power and traction device of the foregoing character, in which a single lever-operated cam affords means for locking the implement or work unit to the power and traction device, and also serves as clutch means for effecting transmission of power from the power and traction device to the implement or work unit.

A further object of our invention is the provision of a power and traction device of the foregoing character, in which the weight of the implement is spring-balanced during the clutching and unclutching operations.

Other and further objects and advantages of our invention will become apparent from the following description when considered in connection with the accompanying drawings, in which—

Fig. 3 is a side elevational view, partly in cross-section, of the device illustrated in Fig. 1;

Fig. 4 is a fragmentary side elevational view, partly in cross-section, with certain parts in different positions from that illustrated in Fig. 3;

Figs. 5, 6 and 7 are perspective views illustrating some of the implements or work units which are adapted for coupling to the power and traction device;

Fig. 10 is a fragmentary perspective view of the power and traction device portion which constitutes the coupling means for the same, with certain parts broken away to show structural details;

Fig. 11 is a perspective view of that portion of the coupling means which is common to all implements and work units intended to be used with the power and traction device and which cooperates with the portion illustrated in Fig. 10; and Fig. 12 is a perspective view of a structural detail which cooperates with the portion illustrated in Fig. 11.

Figure 1:
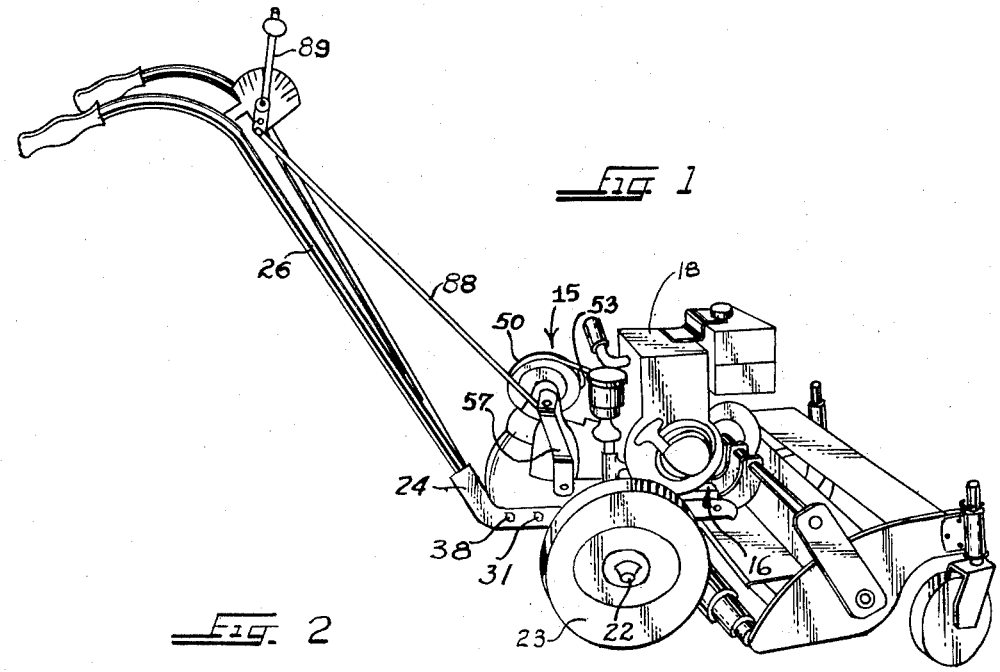
Fig. 1 is a perspective view of a power and traction device in accordance with the present invention, and illustrating an implement coupled to the same for operation.
Figure 2:
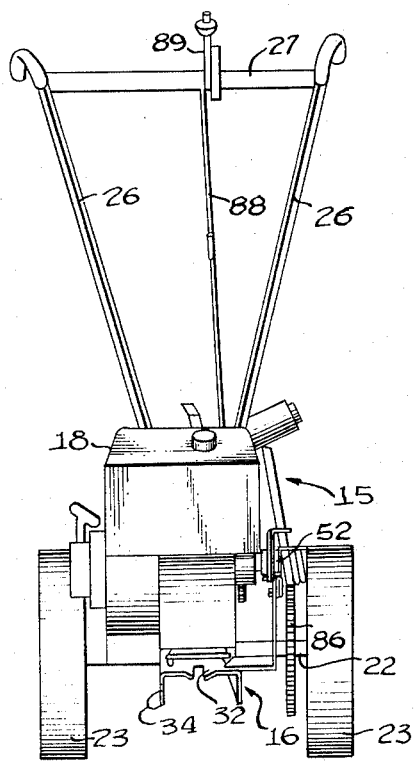
Fig. 2 is a front elevational view of the power and traction device with the implement removed therefrom.

Referring to the drawings, the numeral 15 designates generally a power and traction device comprising a channel frame member 16, the web 17 of which is uppermost and affords a platform for the mounting thereon of an internal combustion engine 18. Welded to the depending flanges 19 and 20 of the channel member, transversely thereof, is an axle housing 21 in which is journalled an axle 22 on the ends of which are supported traction wheels 23. The rearward end of the channel member is embraced by a yoke member 24 which is adjustably secured to the flanges 19 and 20 of the channel member and to which is suitably bolted two handle bars 26 connected by a rigid crossbar 27. The yoke member 24 is shaped in elevation, as illustrated in Fig. 3, and is adapted to pivot about the axis of the coaxially aligned bolts 28, which secure the arms of the yoke member to the flanges 19 and 20 of the channel member. The arms of the yoke member are slotted as at 29 and receive bolts 31. The bolts 28 and 31 afford adjustable securement of the yoke member 24 relative to the channel member 16 and correspondingly the handle bars 26 in any desired position within certain limits.

The forward edge of the web 17 is slotted as at 32, the marginal areas 32a around the slot being depressed as illustrated in Fig. 10. As seen clearly in Fig. 10, the flanges 19 and 20 are provided each with a forwardly opening wedge-shaped slot 33. To the flange 19 is secured, as with rivets, a flat latch spring 34, the free end 34a of which extends beyond the forward edge of the flange 19 and is bent outwardly to facilitate engagement of cooperating parts, as will be hereinafter explained. The said spring is provided with an elongated aperture 36 which is aligned with the slots 33. Secured to the underside of the web 17, as with rivets 37, is a leaf spring 38 having a downwardly turned lip 40 at the free end. The said spring is biased downwardly to normally assume the position illustrated by the solid lines in Fig. 4. A guide pin 39 is suitably anchored in the web 17 and depends therefrom, the leading edge of the said guide pin being tapered. The leaf spring 38 is provided with an aperture 41 through which the guide pin 39 is adapted to pass when the parts are in the relative positions illustrated in Fig. 3.

Journalled in apertures provided in the flanges 19 and 20 of the channel is a shaft 42 having an integral operating lever 43 which extends from one end of the shaft substantially at a right angle to the shaft axis. Welded to the shaft is a cam member 44 which is shaped substantially like that illustrated in Fig. 3. A torsion spring 46 is arranged coaxially with the shaft 42 and one terminal end of said spring is engaged with the cam, as at 47, while the other end 46a of said spring is engaged with the axle housing 21. The spring 46 serves normally to bias the shaft 42 and lever 43 to the position illustrated in Fig. 4, wherein the cam 44 is disposed substantially horizontally. A spring latching means, which consists of a bar 48 journalled in the flanges 19 and 20, has an intermediately offset portion 49 and an integral lever arm 51 bent at a right angle to the main body portion. The latching means is arranged in relation to the end of the leaf spring 38, so that in one position of lever arm 51 (Fig. 10) the offset portion 49 clears the end of the leaf spring 38, permitting freedom of movement thereof, and in another position (see broken lines Fig. 4) said offset portion engages with the lip 40 to lock the spring 38 in a desired position, as will be hereinafter explained.

The web 17 of the channel member 16 affords a platform for a gasoline engine 18 or other suitable power means, the same being provided with a suitable power take-off or driving pulley 52. The said driving pulley through V-belt 53 drives the pulley 50 which, through a series of conventional sprocket wheels and chains 86, is in driving connection with the traction wheels 23. The driven pulley 50 is mounted on a pivoted standard 57 which is connected through control rod member 88 to a control lever 89, the actuation of which effects tightening or loosening of the belt 53 in relation to the driving and driven pulleys, thereby to selectively effect a driving or nondriving connection between the power means and the traction wheels.

As hereinbefore noted, the traction device of my invention incorporates coupling means by which any one of a series of implements, attachments or work units may be quickly connected to the traction device. In Figs. 5, 6 and 7 of the drawings are illustrated different attachments or implements, all of which employ the same construction in the coupling-forming portion. Fig. 5 illustrates a reel type lawn mower A, Fig. 6 a cart B, and Fig. 7 a rotary type lawn mower C. It will be understood that a variety of types of implements and attachments are contemplated, those illustrated in the drawings being merely representative.

The complemental coupling means carried on an attachment or implement is illustrated clearly in Figs. 8, 9, 11 and 12. Each of the attachments or implements includes a pair of arms 54 suitably attached thereto and suitably formed, some straight, others with angular or offset portions, so that the free terminal portions of the arms are disposed at a desired distance above the ground surface, whereby to readily engage with the complemental coupling means of the power and traction device. Each of the arms has an elongated slot 55a therein. An angle section 56 is suitably welded to the terminal portions of the arms 54, as illustrated clearly in Figs. 9 and 12, the vertical leg of the angle section being provided with a medial threaded aperture 57 and the horizontal leg thereof having an upwardly projecting pin 58 fixed therein.

Figure 8:
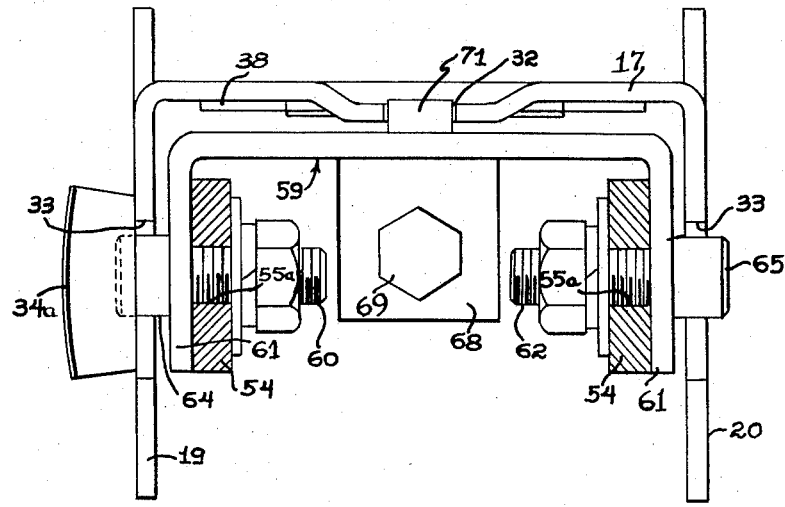
Fig. 8 is a cross-sectional view, on an enlarged scale, taken on line 8—8 of Fig. 3.
Figure 9:
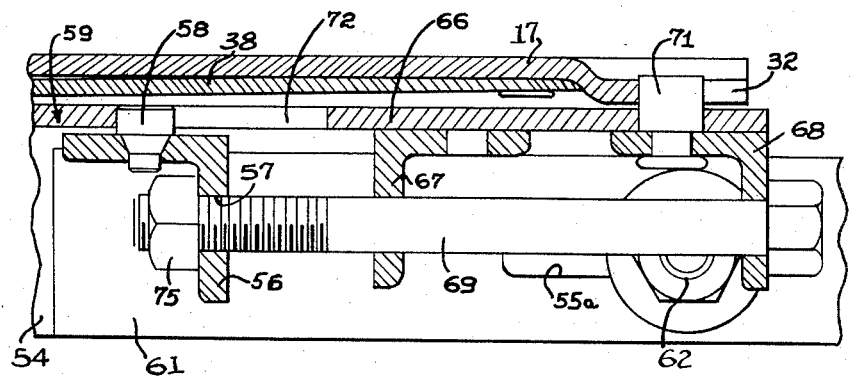
Fig. 9 is a cross-sectional view, on an enlarged scale, of structural details similarly illustrated in Fig. 3.

As seen clearly in Fig. 8, the arms 54 are adapted to be received within an inverted channel member 59 shaped substantially like that illustrated in Fig. 11, the said arms lying contiguous to the depending flanges 61 of the channel member and being adjustably secured thereto by bolts 60 and 62 which pass through registering apertures and slots 63 and 55a, respectively, each of said bolts having substantially cylindrical head portions 64 and 65, respectively, which are adapted to engage in the forward notches 33 of the complementary coupling element, as will be hereinafter explained. Welded to the underside of the web 66 of the inverted channel member 59 are two angle sections 67 and 68 arranged, as illustrated, in opposed relation with each of the said angle sections having a medial aperture, the said apertures being in registering alignment with aperture 57 and all being adapted to receive an adjusting screw 69 which is in threaded engagement with a lock nut 75 welded to the angle section 56. A guide pin 71, preferably provided with a squared body portion, is suitably secured to the web 66 and angle section 68 and extends upwardly above the surface of the web, as illustrated in Figs. 8 and 11. The web 66 is provided with an elongated slot 72 in which is received the pin 58. It will be apparent that, upon rotation of the screw 69, adjustment of the channel member 59 relative to the arms 54 may be readily effected within the limits of the slots 55a and 72 which have substantially identical lengths. Of course, after a desired adjustment has been made the bolts 60 and 62 are tightened so as to secure the arms 54 in a position of adjustment relative to the channel member 59. The purpose of such adjustment is to permit proper tensioning of the power take-off V-belt 55, hereinafter to be described, for maximum efficiency in operation. The web 66 of the channel member is provided near its rearward end with an elongated aperture 73, which is adapted to snugly receive the guide pin 39 carried on the channel member 16 of the complemental coupling element when the respective coupling elements are in interengaged relation. Correspondingly, the guide pin 71 is snugly received within the slot 32 of the channel member 16. The said guide pins, in cooperation with their respective cooperating slots or apertures, afford means whereby the coupling elements when interengaged are maintained in longitudinal alignment and relative lateral movement is substantially prevented.

Each implement or attachment carries a suitably mounted driven pulley 74 which is disposed in operative alignment with the driving or power take-off pulley 52 when the attachment is coupled to the power and traction device. In Figs. 3 and 4, the implement illustrated comprises a reel type mower coupled to the traction unit, the said implement including a pair of angularly inclined arms 76 in which is journaled a shaft 77 carrying a rotatably mounted pulley 74 driven by V-belt 55. The said pulley 74 is operatively connected with a sprocket 78, which is connected in turn through a sprocket chain 79 to another sprocket wheel 81 in driving connection with rotatable blades of the mower. In the implement illustrated in Fig. 7, which comprises a rotary type mower, a pair of idler pulleys 82 are suitably supported on the implement in close proximity to the driven pulley 83, and serve to effect a change of the direction of belt 84 from a vertical to a horizontal plane.

With the foregoing arrangement, the power and traction device can be practically rolled into the attachment or implement and, by manipulation of the parts as will be presently explained, coupling of the implement to the power and traction device may be readily effected. Preliminary to interengaging the cooperating coupling elements, the balance spring 38 is first caused to assume the position illustrated in Fig. 3 by rotation of cam 44 by means of lever 43 to assume the vertical position illustrated in Fig. 3. The lever arm 51 is then rocked to assume the dotted line position illustrated in Fig. 4, wherein the offset latching portion 49 engages under the lip 40 of the balance spring receiving the thrust thereof and limiting movement of the same in a downward direction. Under such conditions the spring 38 assumes the dotted line position illustrated in Fig. 4, and when the cam 44 is thereafter rocked to the position illustrated in Fig. 4, by means of the lever 43 which now assumes a vertical position, there is provided an opening between the spring 38 and the cam 44. The power and traction device may now be rolled against the implement so that the channel member 59 is caused to enter the channel member 16 of the traction device, and the bolt heads 64 and 65 engage in the notches 33 at the forward edges of the channel member 16. Of course, the latching spring 34 will be caused to be cammed outwardly when engaged by screw head 64, permitting entry of the channel member 59 into channel member 16. When the screw heads 64 and 65 are in proper position in slots 33, screw head 64 will be in registration with the aperture 36 of the latch spring 34, at which point the spring 34 will snap back into normal position and retain the channel members 16 and 59 in locked and limited articulated engagement. At this stage the parts are substantially in the relative positions illustrated in Fig. 4, it being understood that the channel member 59 is free to rock within channel member 16 about the axis of bolts 60 and 62 between the cam 44 and the dotted line position of the spring 38. Thus, the axes of the driving and driven pulleys 52 and 74, respectively, are disposed in a relatively closer than normal operating position so that installation of the belt 55 about the said pulleys may be easily effected. The cam 44 is thereafter rocked from the inoperative position illustrated in Fig. 4 to the operative position illustrated in Fig. 3, wherein the operating lever 43 is horizontally disposed. The cam 44, of course, acts on the underside of the channel member 59, moving the same and its associated parts to the position illustrated in Fig. 3. The full thrust of the spring 38 is now carried by the channel member 59 and the latch arm 51 may now be rocked to the inoperative position illustrated in Figs. 10 and 3 and in solid lines in Fig. 4, so that the latch portion 49 is entirely free of the spring 38. Adjustment of the belt 55 to a desired tension may be readily effected by rotation of the screw 69, which effects relative movement of the channel member 59 relative to the arms 54.

Coupling of the implement to the traction and power device is now completed, and the lever 43 now serves as a clutch-operating means for effecting transmission of power from the engine of the traction device to the implement. When the lever 43 is horizontal and the cooperating parts are disposed in the positions illustrated in Fig. 3, the driving and driven pulleys 52 and 74, respectively, are in a maximum spaced-apart relation and the belt 55 is under desired tension to transmit power from the engine 18 through the belt 55 to the implement. It will be noted that when the cam 44 is caused to be rocked from the position illustrated in Fig. 4 to the position illustrated in Fig. 3 the cam 44 is in frictional engagement with the under surface of the web because of the pressure of leaf spring 38 which normally urges the channel member 59 in the direction of the cam 44. As a result, rocking of the cam 44 counterclockwise as viewed in Fig. 4, in addition to rocking the channel member 59 to assume a horizontal position, will also effect an inward movement of the channel member 59 relative to the channel member 16 to the point where the bolt heads 64 and 65 become wedged in the notches 33. In its operative position (Fig. 3) the cam 44 assumes an overcenter position.

When the lever 43, which is spring-biased, is caused to be rocked to a substantially vertical position, as illustrated in Fig. 4, the spring 38 exerts a force on the top of the channel member 59 sufficient to cause the implement to rock about the axis of the bolts 60 and 62 automatically to assume the position illustrated in Fig. 4, wherein the axes of rotation of the pulleys 52 and 74 are moved into closer relationship with each other and the belt 55 is caused to become slack or loosely engaged with the pulleys, causing slippage of the belt 55 on pulley 52, a condition in which no power can be transmitted from the engine.

It will be apparent that the lever 43 thus also operates as a clutch to effect transmission of power from the engine to the implement. Suitable belt guides 80 are provided both on the power and traction device and on the implement to prevent the belt 55 from running off the pulleys when the belt is in slack condition. The relation of the belt guides 80 to the belt 55 and pulleys 52 and 74 is such that there is no interference with the belt by the guides when the belt is under tension. There is also adequate clearance between the said belt guides and the pulleys to permit manual installation or removal of a belt when the pulleys are in the relationship illustrated in Fig. 4 equivalent to a slack condition of the belt.

In order to uncouple the implement from the power and traction device the lever 43 is rocked to a horizontal position, so as to cause the parts to assume the positions illustrated in Fig. 3. The lever arm 51 is then rotated so that the latch portion 49 will effect engagement with the lip 40 and secure the spring 38 in the position illustrated by the dotted lines in Fig. 4. Then the cam lever 43 is again rocked to its vertical position (Fig. 4) in which there is no application of spring pressure on the channel member 59. Thus, the implement may pivot relative to the traction device about the axes of bolts 60 and 62 within the limits of the space defined between the position of the cam 44 and the dotted line position of the spring 38 illustrated in Fig. 4. It will be understood that, when the operator swings the lever 43 clockwise as viewed in Fig. 3 to a point where the cam 44 is overcenter, the torsion spring 46 cooperating with the cam lever 43 will automatically urge the said lever to assume the vertical position illustrated in Fig. 4, with the cam assuming a substantially horizontal position. With the parts in he relative positions illustrated in Fig. 4, the drive belt 55 may easily be removed from the pulley 52, since the belt is now in slack condition. By the operator pulling the latch spring 34 outwardly, the bolt heads 64 and 65 may be freed from the slots 33, permitting separation of the implement from the traction device. The parts of the traction device are now in condition to accept another implement or work unit which is attached in the foregoing manner.

For implements which do not require a belt drive as in the case of the cart attachment illustrated in Fig. 6, the foregoing procedure for attachment or detachment is followed, except that belt installation or removal is not required.

When the parts are in the coupled relationship illustrated in Fig. 3, the guide pin 39 of the traction device engages snugly into the aperture 73 in the web of the channel member 59. Correspondingly, guide pin 71, which is fixed to the channel member 59, engages in the rectangular slot 32 at the forward edge of the channel member 16. The said two guide pins in their respective slots permit the implement or attachment to be accurately located substantially medially of the channel member 16, without the necessity for having the channel member 59 of the attachment fit tightly within the channel member 16 of the traction device. During operation when the belt 55 is in tensioned condition, the belt tension being only on one side of the structure would tend to cock one channel member against the other and thus throw the parts out of alignment. However, the foregoing construction assures precise belt-pulley alignment during operation while providing sufficient clearance to facilitate easy insertion or removal of the channel member 59 of the implement into the channel member 16 of the traction device. The heads 64 and 65 of bolts 60 and 62, when the parts are assembled as illustrated in Fig. 3, are caused to wedge into the slots 33, thereby assuring accurate fore and aft location as well as vertical positioning of the implement relative to the traction device. It will be noted that, when the belt 55 is in tensioned condition as during operation, the said belt assists in maintaining the cooperating channel members in locked relationship. When the belt is in slack condition the spring 34 cooperating with the head 64 secures the channel members against separation. In the case where the implement does not require a belt drive, for example, in the case of an implement such as a cart, the frictional engagement of the channel member 59 with the cam member 44 cooperates with the spring 34 and head 60 in holding the parts in assembled relation.

It will be apparent from the foregoing description that no tools are required in effecting either attachment or detachment of an implement or work unit from the traction and power device. Only a simple wrench or pliers is required to effect adjustment of the screw 69 in order to compensate for wear of the driving belt 55. It is preferable that, with an implement requiring a driving belt, the belt be kept with the particular implement, thereby to avoid the necessity for effecting adjustment for belt tension as the implements are interchanged and each time a particular implement is attached to the power and traction device.

Various changes coming within the spirit of our invention may suggest themselves to those skilled in the art. Hence, we do not wish to be limited to the specific embodiments shown and described or uses mentioned, but intend the same to be merely exemplary, the scope of our invention being limited only by the appended claims.

We claim:

1. A hitch comprising interengaging first and second members, said first member including a channel member having the web portion uppermost and depending side flanges, each of said flanges having a slot opening to the forward edge, a cam rockably supported in said side flanges and disposed intermediate the same, said second member including a channel member having a web portion uppermost and depending side flanges, said last mentioned flanges having axially alined projections engageable in said slots, said second member arranged to be nested in said first member, cooperating means associated with respective web portions to effect operable alinement and securement between said channel members when the web portion of said second member is engaged by said cam and is rocked about the axis of said projections into nested relationship with said first member, a leaf spring secured at one end to the forward end of the web portion of said first member, the other end of said spring engaging the web portion of said second member and normally biasing said second member away from said first member.

2. A hitch comprising interengaging first and second members, said first member including a channel member having the web portion uppermost and depending side flanges, each of said flanges having a slot opening to the forward edge, a cam rockably supported in said side flanges and disposed intermediate the same, said second member including a channel member having a web portion uppermost and depending side flanges, said last mentioned flanges having axially alined projections engageable in said slots, said second member arranged to be nested in said first member, cooperating means associated with respective web portions to effect operable alinement and securement between said channel members when the web portion of said second member is engaged by said cam and is rocked about the axis of said projections into nested relationship with said first member, a leaf spring secured at one end to the forward end of the web portion of said first member, the other end of said spring engaging the web portion of said second member and normally biasing said second member away from said first member, and means selectively engageable with said spring to restrain the force of said spring thereby to facilitate connection or disconnection of said first and second members.

3. In combination a power and traction device, an implement to be driven thereby and a hitch for connecting said implement to said device, said hitch comprising a first channel member associated with said power and traction device, the web portion of said channel member being uppermost and the side flanges of said channel member having alined slots opening to the forward ends thereof, a cam rockably supported in said side flanges and disposed intermediate the same, a leaf spring secured at one end to the underside of said web portion, a second channel member associated with said implement with the web portion thereof uppermost and the side flanges having axially alined projections engageable in said slots, said projections enabling relative rocking motion between said first and second channel members when said projections are engaged in said slots, said leaf spring normally biasing said second channel member in a direction away from said first channel member, and means for rocking said cam to engage the web portion of said second channel member to effect nesting engagement of said second channel member within said first channel member.

4. In combination a power and traction device, an implement to be driven thereby and a hitch for connecting said implement to said device, said hitch comprising a first channel member associated with said power and traction device, the web portion of said channel member being uppermost and the side flanges of said channel member having alined slots opening to the forward ends thereof, a cam rockably supported in said side flanges and disposed intermediate the same, a leaf spring secured at one end to the underside of said web portion, said implement having a pair of parallel arms connected thereto, a second channel member adjustably supported on said arms, means for securing said second channel member to said arms in a position of adjustment, said second channel member having its web portion uppermost and certain of said securing means having axially alined laterally extending projections engageable in said slots, said projections enabling relative rocking motion between said first and second channel members when said projections are engaged in said slots, said leaf spring normally biasing said second channel member in a direction away from said first channel member, and means for rocking said cam to engage the web portion of said second channel member to effect nesting engagement of said second channel member within said first channel member.

References Cited in the file of this patent
UNITED STATES PATENTS

| | | |
|---|---|---|
| 1,644,281 | Ruth | Oct. 4, 1927 |
| 2,489,274 | Donald | Nov. 29, 1949 |
| 2,611,461 | Miller | Sept. 23, 1952 |
| 2,726,099 | Nunn | Dec. 6, 1955 |
| 2,748,907 | Green et al. | June 5, 1956 |